Sept. 29, 1959 G. J. OAKES 2,906,192
BEVERAGE BREWING APPARATUS
Filed May 10, 1954 3 Sheets-Sheet 1
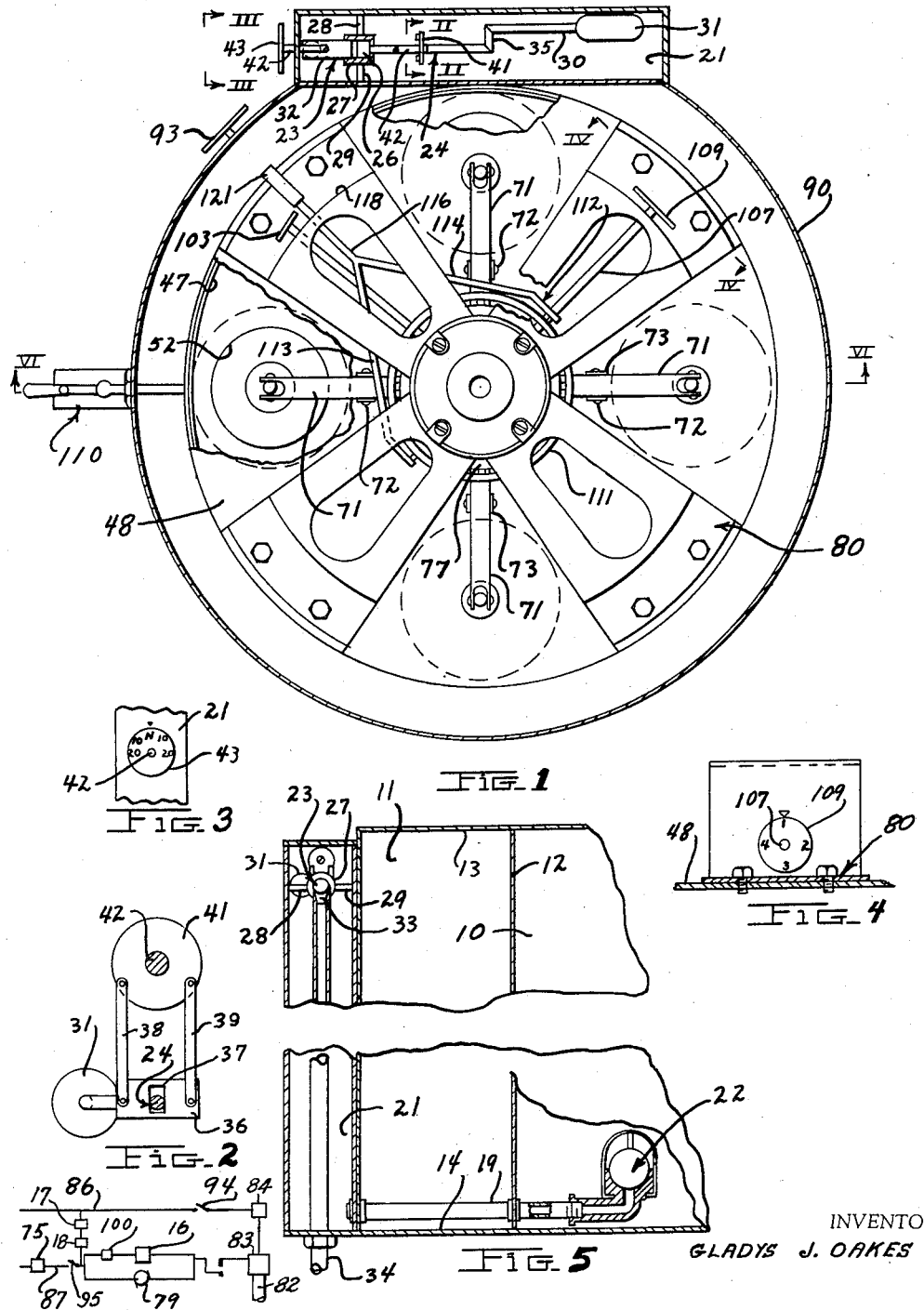
INVENTOR
GLADYS J. OAKES
BY Jennings K. Carter
ATTORNEYS Sept. 29, 1959 G. J. OAKES 2,906,192
BEVERAGE BREWING APPARATUS
Filed May 10, 1954 3 Sheets-Sheet 2

INVENTOR
GLADYS J. OAKES
BY Jennings & Carter
ATTORNEYS

Sept. 29, 1959  G. J. OAKES  2,906,192
BEVERAGE BREWING APPARATUS
Filed May 10, 1954  3 Sheets-Sheet 3
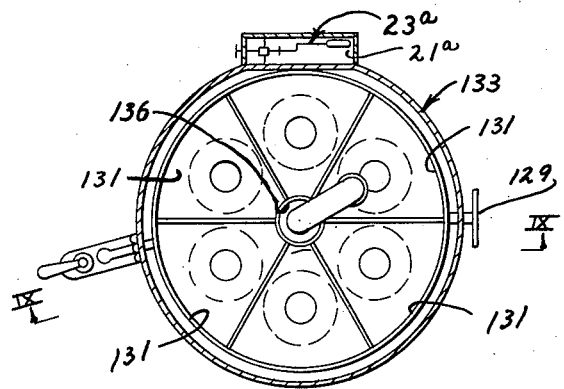
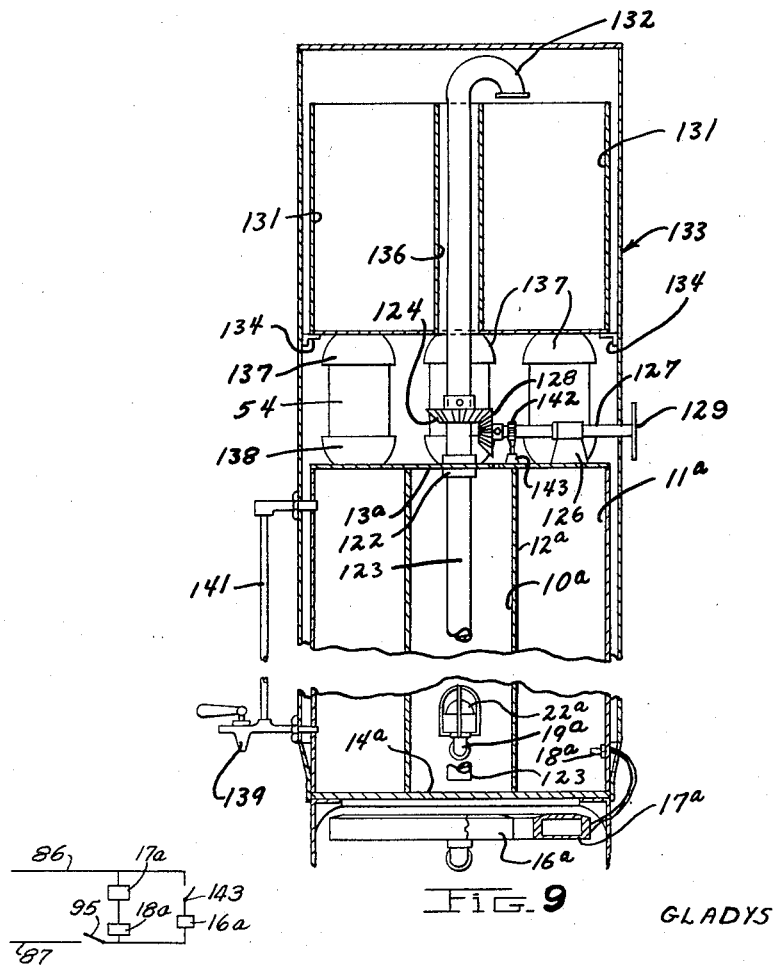
INVENTOR
GLADYS J. OAKES
BY Jennings & Carter
ATTORNEYS

United States Patent Office 2,906,192
Patented Sept. 29, 1959

2,906,192

BEVERAGE BREWING APPARATUS

Gladys J. Oakes, Birmingham, Ala.

Application May 10, 1954, Serial No. 428,610

18 Claims. (Cl. 99—282)

This invention relates to beverage brewing apparatus and has for an object the provision of means for anticipating the need of additional beverage and automatically brewing the same.

Another object of my invention is to provide beverage brewing apparatus which shall produce sequentially and individually precise quantities of fresh beverage which are uniform in quality and strength.

Another object of my invention is to provide beverage brewing apparatus of the character designated which shall be adapted for receiving a plurality of individual canisters or other containers of beverage to be brewed, such as coffee, tea or the like at one time whereby separate fresh batches of beverage are brewed automatically as required, thereby eliminating routine operating attention.

A further object of my invention is to provide beverage brewing apparatus adapted for brewing sequentially separate batches of beverage without the necessity of having to remove the beverage residue until a plurality of batches of beverage has been brewed, thereby permitting mechanical washing and sterilization of the entire apparatus at one time.

A further object of my invention is to provide beverage brewing apparatus embodying adjustable means for varying the strength of the beverage produced.

A further object of my invention is to provide beverage brewing apparatus of the character designated embodying an automatic cut-off which stops operation of the apparatus when the beverage to be brewed is exhausted and which shall also include means for presetting the apparatus for delayed initial starting.

A further object of my invention is to provide beverage brewing apparatus of the character designated which shall include means to measure, retain, heat and dispose precisely and automatically the water required for an individual batch of beverage.

A further object of my invention is to provide beverage brewing apparatus of the character designated which shall include visual means for indicating the beverage container being used, those already used and those to be used.

A still further object of my invention is to provide beverage brewing apparatus of the character designated which shall be simple and compact of construction, economical of manufacture and which shall require a minimum of space for installing the same.

As is well known in the art to which my invention relates, most restaurants have to make coffee from 10 to 30 times per day, which requires from 2 to 7 manhours of labor. In accordance with my invention, I eliminate most of this labor required to make hot beverage, the actual labor required being approximately that required to make one batch of beverage.

Briefly my improved beverage brewing apparatus comprises a boiler for heating water and a plurality of beverage canisters, together with automatically controlled means for heating the water and operable sequentially to discharge precise quantities of the hot water through selected beverage canisters or other containers. The beverage thus brewed is collected in a receptacle where it is maintained at the proper temperature for use.

Apparatus embodiyng features of my invention is shown on the accompanying drawings forming a part of this application, in which:

Fig. 1 is a plan view of the apparatus, partly broken away and in section;

Fig. 2 is a view taken along the line II—II of Fig. 1 and drawn to a larger scale;

Fig. 3 is a view taken generally along the line III—III of Fig. 1;

Fig. 4 is a view taken generally along the line IV—IV of Fig. 1;

Fig. 5 is a fragmental sectional view, showing the means for introducing water into the boiler element;

Fig. 8 is a sectional plan view showing a modified form of my invention;

Fig. 9 is a sectional view taken generally along the line IX—IX of Fig. 8;

Fig. 10 is a schematic wiring diagram of the circuits employed in the apparatus shown in Figs. 1 to 7; and Fig. 11 is a schematic wiring diagram of the circuits employed in the apparatus shown in Figs. 8 and 9.

Figure 6:
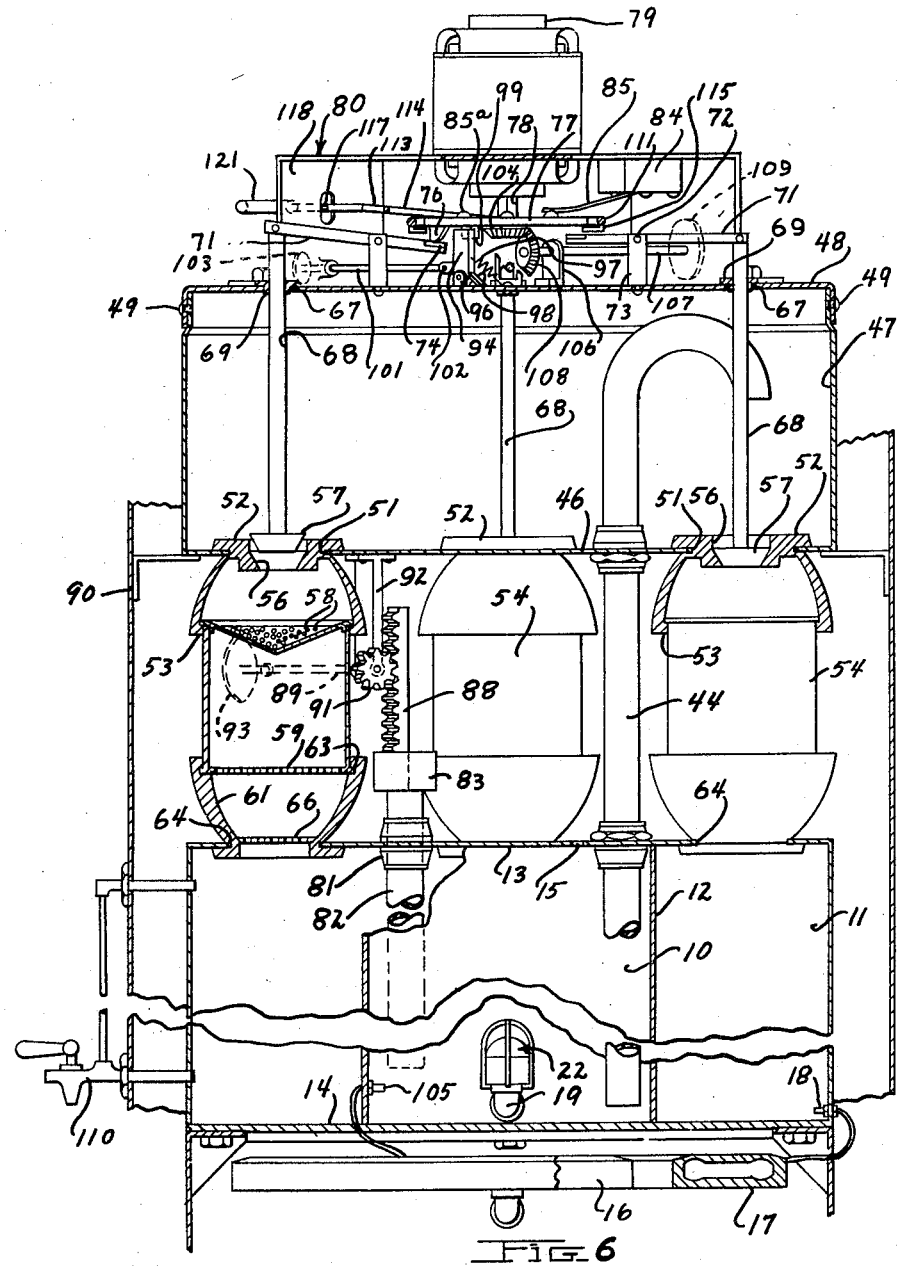
Fig. 6 is a sectional view taken generally along the line VI—VI of Fig. 1.
Figure 7:
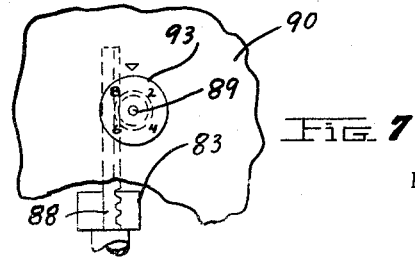
Fig. 7 is a fragmental view showing the means for energizing the apparatus to brew additional beverage when the supply thereof has reached a predetermined level in the beverage receptacle.

Referring now to the drawings for a better understanding of my invention I show a cylindrical boiler 10 surrounded by an annular beverage receptacle 11. The boiler 10 and beverage receptacle 11 are separated by a common annular wall 12 and are provided with top and bottom walls in the form of horizontal sheets of material 13 and 14, respectively, which extend across both the boiler and the beverage receptacle, as shown in Figs. 5 and 6. The boiler 10 is provided with a small vent opening 15 in the top wall thereof to permit the discharge of air as the boiler is being filled with water. Mounted beneath the boiler 10 and the beverage receptacle 11 are concentrically disposed heating elements 16 and 17, respectively. The heating element 16 is of a high heating type and is controlled by means to be described hereinafter. The heating element 17 is of a low heating type and is controlled by suitable thermostat 18 in the beverage receptacle 11.

Water is supplied to the boiler 10 through a conduit 19 which communicates with a supply tank 21. A ball check valve 22 is provided at the outlet end of the conduit 19 to prevent back flow of the water from the boiler 10 to the supply tank 21. The valve ball rests normally in closed position but may be displaced by a full head of water in supply tank 21 when there is no corresponding head of water in boiler 10. When heat is applied to the water in boiler 10 the resultant pressure closes the ball valve as a positive seal. The water level in the supply tank 21 is controlled by a float actuated valve 23.

The valve 23 comprises a stem member 24 having an enlarged inner end 26 mounted for rotation in a bearing sleeve 27 having an inturned annular flange at the inner end thereof to limit outward movement of the stem. Secured to and projecting outwardly from opposite sides of the bearing sleeve 27 are short shaft members 28 and 29 which are mounted for pivotal movement between the side walls of the supply tank 21. The stem 24 is offset at approximately 90° as at 35 and secured to the end of the offset portion is an outer end portion 30. Mounted at the outer end of the stem portion 30 is a float member 31. Secured to the end of the bearing sleeve member 27 opposite the inturned annular flange and projecting outwardly therefrom relative to the stem 24, is a short rod 32 which carries a plug member 33 on the under surface thereof. As shown in Fig. 5, the plug member 33 fits within the upper end of a conduit 34 which supplies water to the tank 21. The upper inner surface of the conduit 34 flares outwardly and the plug 33 is tapered correspondingly toward the lower end thereof to engage the flared upper end of the conduit, thereby closing the valve 23 when the stem 24 is in the raised position.

To vary the amount of water which enters the tank 21 the stem 24 is rotated, thereby raising and lowering the float 31 relative to the inner end of the stem 24. Rotation of the valve stem 24 is accomplished by means now to be described. Mounted on the stem 24 and projecting laterally thereof at substantially right angles is an arm 36 having a vertically extending slot 37 therein for receiving the stem 24 and which permits the float 31 to move vertically. As shown in Fig. 2, the stem 24 is provided with substantially flat side portions which engage the inner surface of the opening 37 to prevent rotation of the stem relative to the arm 36. The flat side portions on the stem 24 are positioned so that the float 31 lies in substantially the same horizontal plane as the inner end of the valve stem when the arm 36 lies in a horizontal plane.

Pivotally connected to the outer ends of the arm 36 are upstanding links 38 and 39. The upper ends of the links 38 and 39 are pivotally connected adjacent opposite sides of a disc member 41. Preferably, the pivotal connections at the upper ends of the links 38 and 39 are 120° or more from each other. The disc member 41 is secured rigidly to a shaft 42 which projects outwardly of the end walls of the tank 21.

Mounted on the outer end of the shaft 42 is a knob 43 having a suitable dial thereon for indicating the position of the float 31 within the tank 21. For instance, when the shaft 42 is turned in a clockwise direction, as shown in Fig. 2, the float 31 is raised, thus causing more water to enter the tank 21. When the shaft 42 is turned in a counterclockwise direction, as shown in Fig. 2, the float 31 is lowered, thereby decreasing the amount of water which enters the tank 21. By so varying the amount of water which enters the tank 21, the strength of the beverage being brewed may be varied in relation to an arbitrary standard strength. As shown in Fig. 3, the letter "N" on the dial indicates the normal position of the float 31 the numerals at the sides of the letter "N" represent the relative positions of the float 31. By providing such a dial for indicating the position of the float 31, the strength of the beverage being brewed may be readily varied by turning the knob 43. For example, in brewing coffee I prefer to vary the strength thereof over a range of approximately 40%. Accordingly, the knob 43 is turned in a clockwise direction to decrease the strength of the beverage up to 20% while the knob is turned in a counterclockwise direction to increase the strength up to 20%.

There are other means of varying the strength of the beverage by regulating the float-valve mechanism as, for example, the installation of a weight slide on a straight shaft, the location of the weight on the shaft determining the normal float position and thus regulating the amount of water introduced into boiler 10.

Communicating with the boiler 10 through the top thereof is an evacuation tube 44. The upper end of the evacuation tube 44 passes through a suitable opening in the bottom 46 of a hot water reservoir 47. The reservoir 47 is preferably cylindrical and has a top cover member 48 which is secured to the upper edge of the reservoir by any suitable means such as screws 49.

The bottom of the reservoir 47 is provided with an annular row of spaced openings 51 for receiving resilient nipple like members 52. The lower ends of the nipple-like members 52 are turned inwardly as at 53 to provide annular flanges which engage the upper portions of beverage canisters or containers indicated at 54. The nipple-like members 52 are provided with centrally disposed openings 56 therein which taper inwardly toward the lower ends thereof for receiving correspondingly tapered ends of plug members 57. Preferably, the upper surfaces of the canisters 54 are in the form of an inverted cone or concave and are provided with a plurality of relatively small openings 58 therein. The canisters are also provided with perforated bottom walls 59 whereby hot water can pass through a canister when its associated plug 57 is raised. The lower ends of the canisters fit in nipple like members 61 having annular grooves in the upper inner surface thereof for receiving an outwardly projecting portion 63 of the canisters.

The nipple like members 61 fit in openings 64 in the top wall of the annular tank 11, as shown in Fig. 6. The openings 64 are positioned directly beneath the openings 51 whereby the canisters 54 remain in a substantially vertical position. Mounted in the lower portion of the nipple-like member 61 is a removable perforated filter disc member 66 which aids further in preventing any residue from the beverage being brewed from passing into the beverage receptacle 11.

Secured to the plug members 57 and projecting upwardly through openings 67 in the top wall 48 of the hot water reservoir 47 are rod members 68. Fitting in the openings 67 and slidably surrounding the rods 68 are suitable sealing members 69. The upper ends of the rods 68 are pivotally connected to the outer ends of lever arms 71. The lever arms 71 are fulcrumed as at 72 to upstanding U-shaped bracket members 73 mounted on the wall 48. The inner ends of the lever arms 71 are provided with rounded upper surfaces 74 which are in position to be engaged by a downwardly projecting cam member 76 mounted on the undersurface of a disc 77. Extending through and operatively connected to the disc 77 is a vertical shaft 78 of a motor unit 79. The motor unit 79 is geared so as to rotate the shaft 78 at a predetermined speed and is supported by a spider member indicated generally at 80. As the motor 79 rotates the disc 77 the downwardly projecting cam member 76 actuates the lever arms 71 sequentially, thereby discharging hot water sequentially into the individual canisters 54. A suitable opening is provided in the top wall of the beverage receptacle for receiving a bearing member 81. Mounted for sliding movement in the bearing member 81 and projecting downwardly into the beverage receptacle is the lower end of a tubular member 82 which communicates at its upper end with a pressure responsive device 83. The pressure responsive device is provided with a suitable diaphragm whereby when the level of the beverage in the receptacle 11 drops to a predetermined level a partial vacuum is created in the tubular member 82 whereby the diaphragm closes suitable contacts in the pressure responsive device 83 which are connected in series with a switch 84 and thereby completes the electric circuit to the motor 79 and the high heat element 16. The contacts in the pressure responsive device 83 which are in series with switch 84 are indicated by the open circuit between the pressure responsive device 83 and the parallel leads to the motor 79 and the high heat element 16, as shown in Fig. 10. The switch 84 is connected to one side of a suitable source of electricity by a lead 86 and the motor 79 and heat element 16 are connected to the other side of the source of electricity by means of a lead 87. As shown in Fig. 6, the switch 84 is provided with a downwardly and inwardly extending actuating member 85 which is disposed to contact sequentially an annular row of members 85a which is in the form of upstanding bosses on the disc 77. Upon contacting each member 85a the actuating member 85 rides upon the same thereby actuating switch 84 to break the electric circuit through the switch 84 to the motor and the high heat element. The switch 84 is a conventional type switch which is actuated by the actuating member 85 upon engagement thereof with the member 85a to break the electric circuit therethrough to the pressure responsive device 83. The switch 84 then remains deenergized until the circuit through the pressure responsive device 83 is again completed when the liquid level in receptacle 11 falls to a predetermined level. The motor and high heat element thus remain in the off position after being deenergized by the actuating member 85 until the switch 84 is energized again by the pressure responsive device 83 when the liquid level falls to the predetermined level. In order to preset the apparatus for delayed initial starting, I provide a time clock 75 in circuit with the lead 87. Also, a master switch 95 is provided in the lead 87 to control the circuit to the motor unit and the heating element 16. The low heat element is on a separate circuit whereby it may remain on to keep the beverage at the proper temperature after the motor unit and high heat element 16 have been cut off.

In order to adjust the vertical position of the tubular member 82 within the receptacle 11 and thereby vary the predetermined level at which the pressure responsive device 83 completes the circuit to switch 84, I mount a vertically extending rack 88 adjacent the upper end thereof. Mounted alongside the rack 88 on a shaft 89 and in position to engage the rack is a pinion 91. The shaft 89 is supported by a suitable bearing at the lower end of a support bracket 92. The upper end of the support bracket is secured to the under surface of the wall 46 of the reservoir 47, as shown in Fig. 6. The shaft 89 projects outwardly of the housing for the apparatus, indicated generally at 90. Mounted at the outer end of the shaft 89 is a knob member 93 having a suitable dial thereon for indicating the position of the pressure responsive device 83. That is, the pressure responsive device may be adjusted so that it completes the circuit to the switch 84 and a new batch of beverage is brewed when the level thereof in the receptacle 11 reaches a predetermined level. For example, the dial on the knob 93 may be adjusted so that a new batch of beverage is brewed when two quarts, four quarts, six quarts or eight quarts remain in the receptacle 11.

To assure that hot water will not be passed through a used canister or container after all of the canisters have been used, I provide stop means which prevents rotation of the disc 77 after one complete revolution thereof. The stop means comprises an upstanding switch element 94 pivotally mounted as at 96 to the upper surface of the wall 48. The switch element 94 is connected in series with the switch 84 and lead 86 and is urged toward a vertical position by means of a tension spring 97 which is connected to the switch element 94 and to the top of the wall 48. It will be noted that when the switch element 94 is in a vertical position, the circuit therethrough to lead 86 and switch 84 is completed. A stop member 98 is mounted on the wall 48 at the side of the switch element 94 adjacent the spring 97 to hold the switch element in vertical position. Mounted on the under surface of the disc 77 and positioned inwardly of the cam member 76 is a downwardly extending detent 99 which engages and actuates the switch element 94 when the disc 77 has made a complete revolution thereby moving the switch element 94 out of its vertical position and breaking the circuit through the switch element 94 to the motor and heating element 16. To release the switch element 94 from the detent 99, a rod 101 is pivotally connected as at 102 to the side of the arm opposite the spring 97. A suitable handle or knob 103 is provided at the outer end of the rod 101 whereby the rod may be pulled to move the element 94 laterally of detent 99 to release the switch element 94 from the detent. It will be understood that the switch element 94 is of the type having normally closed contact points, whereby upon releasing the switch element from the detent 99 the circuit is again completed through the switch element.

Mounted on the motor shaft 78 beneath the disc 77 is a bevel gear 104. Mounted on the upper wall 48 of the reservoir 47 is a bracket 106 having a suitable opening therein for receiving a shaft 107. Mounted at the inner end of the shaft 107 in position to engage the bevel gear 104 is a bevel gear 108. The bevel gears 104 and 108 are of the same size whereby the shaft 107 rotates one revolution for each revolution of the gear 104. Secured to the outer end of the shaft 107 is a knob 109 having a suitable dial therein to indicate the relative position of the shaft 107. That is, numerals are provided on the dial to indicate the position and identity of the canister being used. To permit hand selection at will of any particular container 54, I make the shaft 78 square or splined and provide a similar opening in the disc 77 for receiving the shaft whereby it is free for vertical movement on the shaft. The disc 77 may thus be moved up so that the cam 76 is out of contact with the lever arms 71, thereby permitting the cam 76 to be positioned to actuate any selected one of the valve plugs 57. The disc 77 is moved vertically by means to be described hereinafter. To prevent rotation of the motor unit 79 as the shaft 78 is turned by the knob 109, I provide a connection therebetween which permits the motor to turn the shaft in one direction only. When the shaft 78 is turned in the other direction by the knob 109 it slips relative to the motor unit. While I show four numerals on the dial and show four canisters in the drawing, it will be apparent that any number of canisters or containers may be employed. For example, the canisters may be arranged in a series of annular rows or may be arranged in a straight line. The weight of the disc and its frictional contact with the shaft 78 prevents vertical movement thereof when the cam 76 engages the arms 71.

The apparatus is cleaned by removing the canisters 54 and inserting in their place suitable cylindrical members of a size corresponding to that of the vertical walls of the canisters. All of the plugs 57 are then raised and a suitable cleaning solution is passed through the cylindrical members and the receptacle 11. The solution is removed from the receptacle 11 by means of a spigot 110, which is also used to dispense the beverage. To raise all of the rods 68 and plugs 57 at one time for cleaning the apparatus, I provide a ring 111 which surrounds the disc 77 as shown in Figs. 1 and 6. Pivotally connected to opposite sides of the ring 111 is a yoke member 112 having arms 113 and 114. Connected to the arms 113 and 114 is a lever arm 116 which is pivotally connected, by means of a pivot pin 117, to an upstanding wall 118 of the spider member 80. Secured to the outer end of the lever arm 116 is a handle member 121 which is employed to move the lever arm 116 about its pivot point whereby the ring member 111 is raised and lowered. As the ring member 111 is lowered it engages the inner ends of the lever arms 71 thereby rocking the same about their pivot points and lifting the stoppers 57 from the openings 56. Thus, with all stoppers 57 raised and all openings 56 open, and with the previously described cylindrical members in substitute position of canisters 54, hot water may be evacuated from the boiler 10 to the water reservoir 47, thence to flow by gravity through the entire beverage making system and to be expelled through spigot 110.

To assure that the heat element 16 is turned off when the water in the boiler reaches a predetermined temperature, I mount a thermostat 105 adjacent the bottom of the boiler. The thermostat 105 actuates a switch 100 which is in circuit with the heat element 16, as shown in Fig. 10.

To raise and lower the disc 77 inwardly extending brackets 115 are mounted at the lower edge of the ring 111 in position to engage the under surface of the disc 77. When the inner end of the rod 116 is raised by pressing down on the handle 121 the brackets 115 engage the disc and cause the same to be lifted.

From the foregoing description the operation of my improved apparatus will be readily understood. The canisters 54 are filled with fresh beverage to be brewed, such as coffee, and placed between the nipple members 52 and 61, as shown in Fig. 6. With the receptacle 11 empty, current passes through, the pressure responsive device 83 and the switch 84 to the motor unit 79 and to the high heating element 16. The motor unit 79 rotates the shaft 78 at such a speed that by the time the water in the boiler 10 is boiling and being delivered into the reservoir 47 by the evacuation tube 44 it actuates the first one of the rods 68 thereby raising its associated plug 57 from the opening 56 and admitting hot water into the first canister. At this time the contact member 85 rides upon the member 85a, thereby breaking the circuit through switch 84 to the motor and the high heat element. As soon as the volume of the beverage in the reservoir 11 falls to a predetermined level, as determined by the pressure responsive device 83, the current is again completed through the device 83 and switch 84 to energize the motor and high heating element. The cam 76 then moves out of contact with the lever arm 71, thus permitting the raised plug 57 to move to seated position in its associated opening 56. The rod 68 carrying the plugs 57 are thus operated sequentially by means of the motor until all of the individual canisters 54 have been used. The tube 82 is raised and lowered by means of the knob 93 to vary the amount of beverage remaining in the receptacle 11 when a new batch is to be brewed. The pressure responsive device 83 operates on a fixed pressure range, and the pressure in tubular member 82 at different liquid levels can be made to correspond to that range by varying the height of a tubular member 82 submerged in the liquid beverage. That is to say, by raising and lowering the pressure responsive device 83 a new batch of beverage may be brewed when the level has reached any desired level, such as two quarts, four quarts, six quarts, eight quarts or the like. The beverage in the receptacle is maintained at the proper temperature by means of the thermostat 18.

While I have shown the high heat element 16 as being controlled by the time interval required for the motor unit 79 to rotate the disc 77 a predetermined distance, it will be apparent that the heat element may be controlled by other means such as the thermostat 105 positioned in the wall of the boiler 10 or by a float member which would actuate a switch.

Referring now to Figs. 8 and 9 of the drawings, I show a modified form of my invention, which is semi-automatic in operation. The apparatus comprises a cylindrical boiler 10a surrounded by an annular beverage receptacle 11a. The boiler 10a and receptacle 11a are separated by a common annular wall 12a, and are provided with top and bottom walls in the form of horizontal sheets of material 13a and 14a respectively, which extend across both the boiler and the beverage receptacle, as shown in Fig. 9.

What is supplied to the boiler 10a from a supply tank 21a through a conduit 19a which communicates at its discharge end with a ball check valve 22a. The supply of water in the tank 21a is regulated by a water level float and valve arrangement 23a which is similar in all respects to the valve 23, shown in Figs. 1 and 5.

The boiler 10a is heated by a high heating element 16a and the beverage receptacle 11a is heated by a low heat element 17a which is controlled by a thermostat 18a. Electric current is supplied to the thermostat 18a and heat elements 16a and 17a, by the lead 86 and the lead 87 having the master switch 95 in circuit therewith.

Mounted for rotation in a suitable bearing 122 and extending through the upper wall of the boiler 10a is a vertical evacuation tube 123. Mounted on the evacuation tube 123 above the boiler 10a is a bevel gear 124. Mounted on the upper surface of the sheet of material 13a forming the top for the boiler and beverage receptacle is a bearing bracket 126 which supports a horizontal shaft member 127. Secured to the inner end of the shaft 127 is a bevel gear 128 which meshes with the bevel gear 124. A suitable knob 129 is mounted at the outer end of the shaft 127 for rotating the same. It will thus be seen that by rotating the knob 129 the evacuation tube 123 may be rotated to any desired position.

Mounted above the boiler 10a and beverage receptacle 11a and spaced at an elevation therefrom are a plurality of hot water receptacles 131. The hot water receptacles 131 may be of any desired shape, such as the substantially triangular shape shown in Fig. 8. The upper end of the evacuation tube is bent over as at 132 whereby the discharge end thereof extends over a selected one of the receptacles 131. The hot water receptacles 131 are supported from a substantially annular outer housing member 133 by any suitable means such as angle brackets 134. As shown in Fig. 9, the evacuation tube 123 extends upwardly through a centrally disposed opening 136 formed between the receptacles 131.

Mounted in the bottom of each of the receptacles 131 is a resilient nipple member 137 and mounted in the upper wall of the annular beverage receptacle 11a beneath the nipple member 137 are resilient nipple members 138. The nipple members 137 and 138 are similar in all respects to the nipple members 52 and 61 and are adapted to hold the beverage canisters 54. The brewed beverage is dispensed from the receptacle 11a by means of a suitable spigot 139. Communicating with the upper and lower portions of the beverage receptacle 11a, as shown in Fig. 9 is a glass water gauge 141 which indicates the amount of beverage remaining in the beverage receptacle 11a.

Mounted on the shaft 127 between the bevel gear 128 and the bearing bracket 126 is a gear member 142 which actuates a time switch indicated generally at 143. The time switch 143 is in circuit with the high heating element 16a and the leads 86 and 87 whereby the heating element is automatically cut-off after the lapse of a pre-determined time. Preferably, the time switch 143 is of a spring actuated type and in which pressure is applied to the spring by the rotation of the gear member 142. In view of the fact that such time switches are well known in the art, no detail description thereof is deemed necessary.

From the foregoing description the operation of my semi-automatic beverage brewing apparatus will be readily understood. A suitable beverage, such as coffee, is placed in the canisters or containers 54 and inserted between the nipple members 137 and 138. The knob 129 is then rotated to position the upper end 132 of the evacuation tube over a selected one of the hot water receptacles 131. As this is done, the time switch 143 is actuated by the gear member 142, thus completing the circuit to the high heating element 16a. After the lapse of a predetermined time, the time switch 143 breaks the circuit to the high heating element. This predetermined time is the actual time that it takes to boil the water in the boiler 10a and can be determined by simple tests under desired dimensional circumstances. That is to say, the high heating element 16a is turned off at the time the hot water is evacuated through the tube 123 to the hot water receptacle 131. The hot water passes from the receptacle 131 through its associated canister or container 54 into the beverage receptacle 11a.

The level of the beverage in the receptacle 11a is indicated by the glass water gauge 141. When the operator sees that the beverage level is getting low, he again turns the knob 129 thereby rotating the evacuation tube 132 to the next hot water receptacle 131. At this time, the time switch 143 is again energized thus causing the high heating element 16a to remain on for a predetermined time. This operation is continued until all of the canisters 54 have been used.

Knob 129 is formed integrally with shaft 127 and may be equipped with a dial and pointer which would indicate visually the water compartment and-or canister being used and those used and unused.

This semi-automatic variation can of course, be made into a fully automatic apparatus by the installation of a pressure responsive switch 83 and assembly as previously described and a regulated motor for rotating tube 123 with similar switch mechanism.

Mechanical washing of the semi-automatic variation is accomplished by merely revolving slowly the rotatable upper section of evacuation tube 123 during the time in which the boiler 10a is being evacuated and while the previously described cylindrical members are in substitute place of canisters 54.

From the foregoing it will be apparent that the hot water in boiler 10 may be disposed selectively in other ways, as, for example, by arranging the boiler in an elevated position in relation to the beverage reservoir and equipping it with syphon or gravity flow evacuation tubes having valves mounted therein which are openable individually and sequentially to route the water to the canister associated with the syphon tube.

From the foregoing it will be seen that I have devised improved apparatus for brewing beverages. By providing means for automatically brewing sequentially separate batches of beverage, a fresh supply of beverage is assured at all times. Also, by providing automatic means for operating the apparatus whereby fresh batches of beverage are made as required and by eliminating the necessity of personal attention and the removal of waste and of washing the utensil incidental to every beverage making operation, I reduce greatly the labor required and yet produce a uniform quality of beverage. Furthermore, by providing means for positioning a plurality of beverage canisters or containers in the apparatus for brewing individual batches of the beverage together with means for washing the entire apparatus at one time I reduce further the labor required.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. Beverage brewing apparatus comprising a boiler for heating water, means supplying precise quantities of water to said boiler, a hot water reservoir above and in direct communication with said boiler to receive said precise quantities of water therefrom, means heating said boiler whereby said precise quantities of hot water are evacuated from said boiler to said hot water reservoir when the steam pressure in the boiler reaches a predetermined amount, there being a plurality of openings in the bottom of said reservoir, a beverage receptacle beneath said reservoir, there being a plurality of openings in the top of said receptacle beneath said openings in the reservoir, beverage containers having perforated upper and lower ends supported between said openings in the reservoir and the openings in said receptacle, valve plugs in said openings in the reservoir, vertical rods connected to said plugs, a motor unit operatively connected to said rods and adapted to move said valve plugs sequentially to open position whereby the hot water passes sequentially through said containers to said receptacle, means starting said motor unit when the beverage in the receptacle drops to a predetermined level, means stopping said motor unit when a measured quantity of water passes from the boiler to the reservoir, and means controlling the temperature in said beverage receptacle.

2. Apparatus as defined in claim 1 in which the means for starting the motor unit comprises a pressure responsive device in circuit with the motor and in communication with the beverage receptacle.

3. Apparatus as defined in claim 1 in which the means stopping the motor unit when a measured quantity of water has passed from the boiler to the reservoir comprises a rotatable member connected to the motor unit, spaced projections on said rotatable member, and a switch element in position to engage one of said projections when the rotatable member has rotated a predetermined distance, whereby the circuit to the motor unit is broken.

4. Beverage brewing apparatus comprising a boiler for heating measured quantities of water, a reservoir in communication with the heating means for receiving the water thus heated, there being a plurality of openings in the bottom of said reservoir, a beverage receptacle beneath said reservoir, there being a plurality of openings in the top of said receptacle beneath said openings in the reservoir, beverage containers having perforated upper and lower ends supported between said openings in the reservoir and the openings in said receptacle, valve plugs in said openings in the reservoir, rods connected to said plugs, lever arms fulcrumed intermediate their ends and connected at their outer ends to said rods, a motor unit, a rotatable member connected to said motor unit, a cam on said rotatable member in position to engage sequentially the inner ends of said lever arms whereby the outer ends of the lever arms carrying the rods and plugs are raised whereupon the water passes from the reservoir through the containers to said receptacle, means starting said motor unit when the beverage in the receptacle drops to a predetermined level, means stopping said motor unit when a measured quantity of water passes from the boiler to the reservoir, and means controlling the temperature in said beverage receptacle.

5. Beverage brewing apparatus as defined in claim 4 in which means is provided for raising concomitantly, all of the rods carrying the valve plugs.

6. Beverage brewing apparatus as defined in claim 5 in which the means for raising all of the rods comprises a ring surrounding the rotatable member and positioned over the inner portions of the lever arms, and a lever arm for raising and lowering said ring.

7. Apparatus as defined in claim 6 in which the rotatable member is mounted for axial sliding movement on a shaft member which is operatively connected to the motor, and inwardly extending brackets are mounted on the ring in position to engage the under surface of the rotatable member, whereby the rotatable member is raised in response to raising said ring member, and means is provided for rotating said rotatable member independent of the motor unit.

8. Beverage brewing apparatus comprising a cylindrical boiler for heating water, an annular beverage receiving receptacle surrounding said boiler, means supplying a precise quantity of water to said boiler, a hot water reservoir above said beverage receiving receptacle to receive said precise quantity of water, an evacuation tube connecting said boiler with said hot water reservoir whereby hot water is conveyed to said reservoir when the steam pressure in the boiler reaches a predetermined amount, means supplying said precise quantity of water to said boiler immediately said hot water is evacuated, there being an annular row of openings in the bottom of the reservoir, there being an annular row of openings in the top of said beverage receiving receptacle positioned beneath said openings in the reservoir, beverage containers having perforated upper and lower ends positioned between said openings in the bottom of the hot water reservoir and the openings in the top of said beverage receiving receptacle, resilient nipple like members in the openings in the bottom of the hot water reservoir and in the top of the beverage receptacle for receiving the upper and lower ends, respectively, of the containers, means operable sequentially to discharge said precise quantity of hot water through said openings in the bottom of the reservoir whereby it passes through said containers to said receptacle, and means controlling the temperature in said beverage receptacle.

9. Apparatus as defined in claim 8 in which the vertical position of the pressure responsive device may be adjusted, whereby the amount of beverage remaining in the receptacle at the time the controlled means is energized may be varied.

10. Beverage brewing apparatus comprising a water supply tank, a boiler, a hot water reservoir in communication with said boiler, a heating element for heating said boiler, means evacuating the contents of said boiler and conveying the same to said reservoir when said contents reach a predetermined temperature, means introducing a measured quantity of water into said supply tank, a conduit connecting the supply tank to the boiler, a check valve in said conduit conveying said measured quantity of water from said supply tank to said boiler immediately after the heated contents of the boiler have been evacuated, a beverage receiving receptacle, a plurality of perforated beverage containers between said reservoir and said receptacle, there being openings in said reservoir and said receptacle in communication with said containers, level control means operable when the beverage in said receptacle drops to a predetermined level to energize said heating element and to convey the contents of the reservoir sequentially through individual ones of said beverage containers and means controlling the temperature in said receptacle.

11. Beverage brewing apparatus comprising a cylindrical boiler surrounded by an annular beverage receptacle, and adapted for heating a precise quantity of water, a hot water reservoir above said beverage receptacle and subdivided into an annular row of compartments, beverage containers having perforated upper and lower ends positioned between said compartments and said beverage receptacle, there being openings in the bottoms of said compartments and in the top of said beverage receptacle in communication with said beverage containers, an evacuation tube mounted for rotation between said compartments in communication with said boiler to discharge said precise quantity of hot water into a selected one of said compartments when the steam pressure in the boiler reaches a predetermined amount whereby the hot water flows through a beverage container to said receptacle, and automatically operated means supplying a precise quantity of water to said boiler immediately the hot water is evacuated therefrom.

12. Beverage brewing apparatus comprising a water reservoir subdivided into an annular row of compartments, means connecting said compartments with individual beverage containers having perforated upper and lower ends, a rotatable tube positioned between said compartments and adapted to discharge measured quantities of hot water into selected ones of said compartments whereby the water flows through a subjacent beverage container, a boiler and heating element for heating said measured quantities of water, means introducing said measured quantities of water into said boiler immediately the hot water is discharged therefrom, means for rotating said tube, a time switch connected to said heating element and operable responsive to rotation of said tube from one compartment to another to actuate said heating element to heat said water for a predetermined time, and a receptacle in communication with said containers for receiving the beverage thus brewed.

13. Beverage brewing apparatus comprising a cylindrical boiler for heating water, an annular beverage receiving receptacle surrounding said boiler, means supplying a precise quantity of water to said boiler, a hot water reservoir above said beverage receiving receptacle to receive said precise quantity of water, an evacuation tube connecting said boiler with said hot water reservoir whereby hot water is conveyed to said reservoir when the steam pressure in the boiler reaches a predetermined amount, means supplying said precise quantity of water to said boiler immediately said hot water is evacuated, there being an annular row of openings in the bottom of the reservoir, there being an annular row of openings in the top of said beverage receiving receptacle positioned beneath said openings in the reservoir, beverage containers having perforated upper and lower ends positioned between said openings in the bottom of the hot water reservoir and the openings in the top of said beverage receiving receptacle, valve plugs positioned in said openings in the bottom of the reservoir, control means for actuating said plugs sequentially to discharge said precise quantity of hot water through said openings in the bottom of the reservoir whereby it passes sequentially through said containers to said receptacle, and means controlling the temperature in said beverage receptacle.

14. Beverage brewing apparatus comprising a boiler for heating water, an annular beverage receiving receptacle surrounding said boiler, means supplying a precise quantity of water to said boiler, a hot water reservoir above said beverage receiving receptacle and in communication with said boiler to receive said precise quantity of water therefrom, the bottom of said reservoir and the top of said beverage receiving receptacle being spaced and having aligned openings therethrough, beverage containers having openings at both ends thereof positioned between the aligned openings in said receptacles and said reservoir, resilient members arranged in the openings in the bottom of the hot water reservoir and in the top of the beverage receptable for receiving the upper and lower ends, respectively, of the containers, means operable sequentially to discharge said precise quantity of hot water through said openings in the bottom of the reservoir whereby it passes through said containers to said receptacle, and means controlling the temperature in said beverage receptacle.

15. Apparatus as defined in claim 14 in which the means operable sequentially to discharge hot water through the openings in the bottom of the reservoir comprises valve plugs in said openings, and control means for actuating said plugs.

16. Beverage brewing apparatus comprising a cylindrical boiler for heating water, an annular beverage receiving receptacle surrounding said boiler, means supplying a precise quantity of water to said boiler, a hot water reservoir above said beverage receiving receptable to receive said precise quantity of water, an evacuation tube connecting said boiler with said hot water reservoir whereby hot water is conveyed to said reservoir when the steam pressure in the boiler reaches a predetermined amount, means supplying said precise quantity of water to said boiler immedately said hot water is evacuated, there being an annular row of openings in the bottom of said reservoir, there being an aligned annular row of openings in the top of said beverage receiving receptacle positioned beneath said openings in the reservoir and spaced therefrom, an annular row of rigid beverage containers having perforated upper and lower ends supported between said openings in the bottom of the hot water reservoir and the openings in the top of said beverage receiving receptacle, means operable sequentially to discharge said precise quantity of hot water through said openings in the bottom of the reservoir whereby it passes through said containers to said receptacle, and means controlling the temperature in said beverage receptacle.

17. Apparatus as defined in claim 16 and further characterized in that the means supplying said precise quantity of water to said boiler comprises a water supply tank and a conduit connecting the supply tank with the boiler, and control means are provided for controlling the amount of water entering said tank, said control means comprising a float actuated valve within said supply tank having a stem with an enlarged end, a pivotally mounted bearing sleeve receiving said enlarged end and allowing said end to rotate therein thereby adjusting the height of said float valve regulating the supply of water.

18. Beverage brewing apparatus comprising an annular row of individual beverage containers having openings at both ends thereof for allowing the passage of water therethrough, a boiler for heating precise quantities of water, automatically controlled heating means for heating said boiler, a beverage receiving receptacle surrounding said boiler, a hot water reservoir above said beverage receiving receptacle and in communication with said boiler to receive said precise quantities of water therefrom, means operable sequentially to convey said precise quantities of hot water from said reservoir through said annular row of individual beverage containers, automatically controlled means introducing a precise quantity of cold water into said boiler immediately said hot water is removed therefrom, a pressure responsive control device in said beverage receiving receptacle energizing said controlled heating means when the beverage in the beverage receiving receptacle falls to a predetermined level, and means deenergizing said controlled heating means when a measured quantity of water passes through one of said beverage containers.

References Cited in the file of this patent

UNITED STATES PATENTS

| | | |
|---|---|---|
| 413,471 | Zimmerman | Oct. 22, 1889 |
| 663,723 | Brown et al. | Dec. 11, 1900 |
| 763,401 | Januliewicz | June 8, 1904 |
| 855,702 | Goddard | June 4, 1907 |
| 1,549,840 | Lemoine | Aug. 18, 1925 |
| 1,603,130 | McDuffie | Oct. 12, 1926 |
| 1,822,433 | Brand | Sept. 8, 1931 |
| 1,971,382 | Petersen et al. | Aug. 28, 1934 |
| 2,052,476 | Koch | Aug. 25, 1936 |
| 2,057,430 | Herrera | Oct. 13, 1936 |
| 2,149,270 | Burgess | Mar. 7, 1939 |
| 2,194,807 | Oyen et al. | Mar. 26, 1940 |
| 2,288,240 | Herman | June 30, 1942 |
| 2,484,054 | Sharp | Oct. 11, 1949 |
| 2,493,932 | Swanson | Jan. 10, 1950 |
| 2,568,840 | Zees | Sept. 25, 1951 |
| 2,656,927 | Prendergast | Oct. 27, 1953 |
| 2,737,236 | Estes | Mar. 6, 1956 |
| 2,761,200 | Arnett | Sept. 4, 1956 |

FOREIGN PATENTS

| | | |
|---|---|---|
| 15,855 | Great Britain | A. D. 1898 |
| 433,456 | France | Oct. 30, 1911 |
| 547,288 | France | Sept. 16, 1922 |
| 548,160 | France | Oct. 13, 1922 |
| 593,547 | France | May 29, 1925 |
| 576,628 | Great Britain | 1946 |